United States Patent [19]

Lindabury, Sr.

[11] Patent Number: 4,535,938

[45] Date of Patent: Aug. 20, 1985

[54] FLUID TIGHT JOINT AND SYSTEM OF DISTRIBUTING FLUIDS

[76] Inventor: Tryon S. Lindabury, Sr., 2533 Claiborn Cir., Wichita, Kans. 67226

[21] Appl. No.: 423,867

[22] Filed: Sep. 27, 1982

[51] Int. Cl.³ .............................................. A01G 25/02
[52] U.S. Cl. .................................. 239/269; 285/168; 285/185; 285/404; 285/423; 239/587
[58] Field of Search ........................ 285/185, 168, 404; 239/200, 207, 567, 587, 269

[56] References Cited

U.S. PATENT DOCUMENTS

| | | | |
|---|---|---|---|
| 318,790 | 5/1885 | Patton | 285/185 X |
| 451,300 | 4/1891 | Drew | 285/185 X |
| 1,765,693 | 6/1930 | Muend | 285/185 X |
| 1,914,850 | 6/1933 | Foster | 239/269 |
| 2,857,622 | 10/1958 | Cleverly | 239/567 X |
| 3,258,283 | 6/1966 | Winberg et al. | 285/404 X |
| 3,326,551 | 6/1967 | Clarke | 239/567 X |
| 4,008,910 | 2/1977 | Roche | 285/423 X |
| 4,045,059 | 8/1977 | Smith | 285/185 X |
| 4,405,085 | 9/1983 | Meyer | 285/404 X |

Primary Examiner—Thomas F. Callaghan
Attorney, Agent, or Firm—John H. Widdowson

[57] ABSTRACT

A system for distributing fluids over a planar surface comprising a plurality of lengths of rigid perforate tubing and a plurality of fluid-tight articulated joints, each joint having an inlet port and a discharge port. The lengths of tubing and the joints are connected ad seriatim with joints interposed between adjacent lengths of tubing whereby the tubing can be arranged in accordance with the distribution pattern over a portion of the area. Each port of the fluid-tight joint communicates with a body element having a central bore and a peripheral flange. The flange of the inlet port mates with the flange of the discharge port so that the central bores fall into register with one another and the body elements of the respective ports communicate so that fluid introduced into the inlet port exits through the discharge port. A fastener is received in the bores for securing the body elements together while providing an axis for relative motion between the ports and a seal is sandwiched between the flanges and the bores for maintaining a fluid-tight connection while permitting the relative motion of the ports about the axis.

5 Claims, 19 Drawing Figures

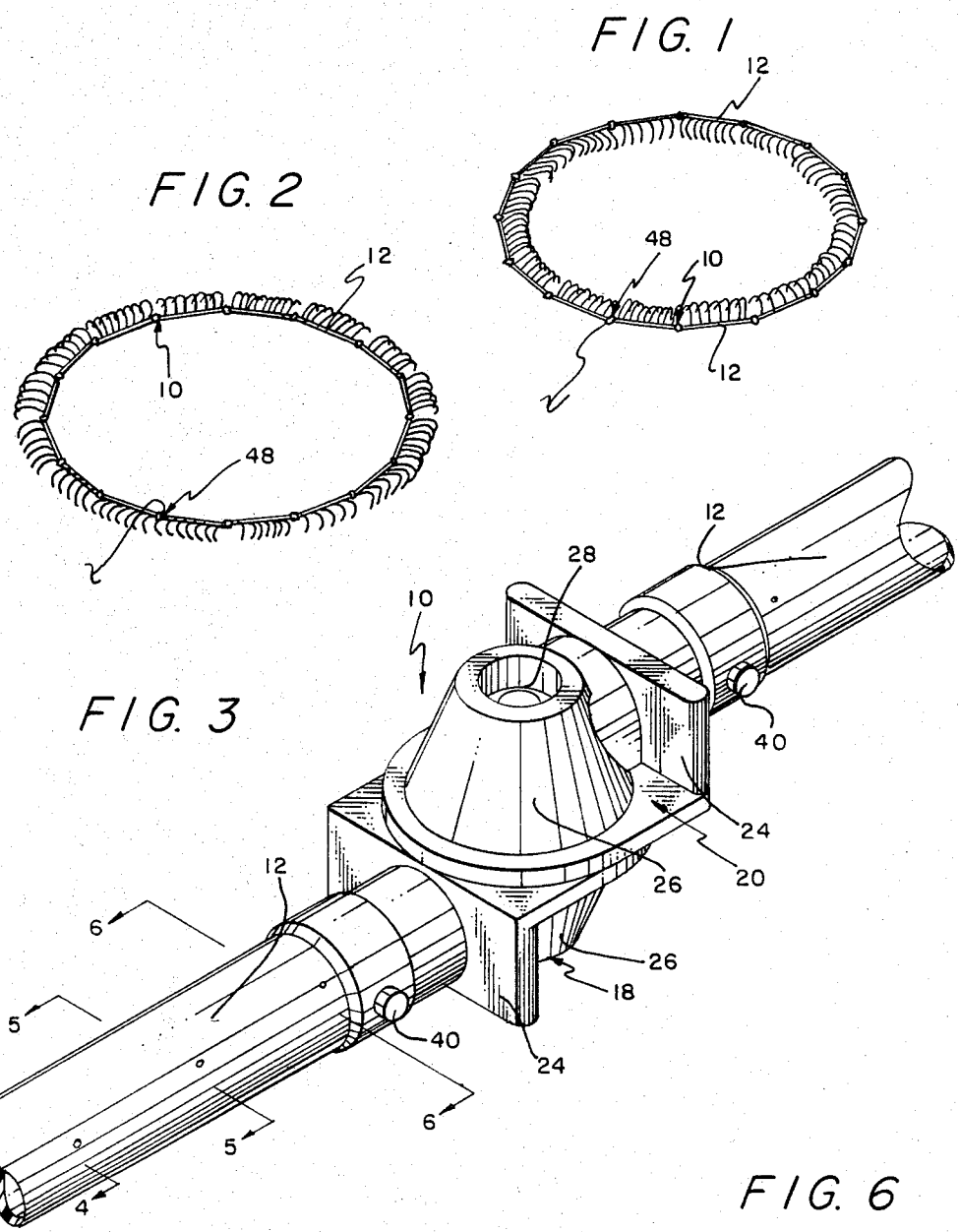

ID=4,535,938

FLUID TIGHT JOINT AND SYSTEM OF DISTRIBUTING FLUIDS

BACKGROUND OF THE INVENTION

1. Field of the Invention

This invention provides a means and method of distributing fluid. More particularly this invention provides a novel fluid-tight joint, a system and method of distributing fluids and a method of storing or stacking or packaging tubes.

2. Description of Prior Art

U.S. Pat. No. 2,514,725 by Schlaphoff et al illustrates a sprayer wherein the articulated sectors may be moved relative to each other and which allow the passage of fluid through or around the articulated joint.

U.S. Pat. No. 2,843,424 by Bruce et al discloses another articulated sprayer wherein there are a plurality of jointed sections.

U.S. Pat. No. 3,166,252 by O'Brien et al illustrates a swivel mount for spray nozzles wherein the swivel joint allows the passage of fluid through the supply line to the outlet.

U.S. Pat. No. 1,914,850 by Foster teaches an irrigation system which may be configured in a desired manner by arranging the elbow joints as desired.

None of the foregoing prior art teaches or suggests the particular fluid-tight joint, the system and method of distributing fluids, the method of storing or stacking or packaging tubes, of this invention.

SUMMARY OF THE INVENTION

This invention accomplishes its desired object by providing a fluid tight joint for connecting fluid conduits in series comprising an inlet port and a discharge port. Each port communicates with a body element having a central bore and a peripheral flange. The flange of the inlet port mates with the flange of the discharge port so that the central bores fall into register with one another and the body elements of the respective ports communicate so that fluid introduced into the inlet port exits through the discharge port. A fastener means is received in the bores for securing the body elements together while providing an axis for relative motion between the ports, and seal means is sandwiched between the flanges and the bores for maintaining a fluid-tight connection while permitting the relative motion of the ports about the axis. This invention also accomplishes its desired objects by providing a method of distributing fluid over a generally planar surface in accordance with a predetermined distribution pattern comprising the steps of providing a plurality of lengths of perforate rigid tubes; connecting the lengths in series by means of fluid-tight connectors, each of the connectors having an inlet port which is movable relative to a discharge port; arranging the lengths of tubing in accordance with said pattern; and introducing fluids into said series of tubes whereby fluid emerges from said perforate tubes and is distributed over said surface. This invention also provides a system for distributing fluids over a generally planar surface of indefinite area in accordance with a predetermined fluid distribution pattern comprising a plurality of lengths of rigid perforate tubing; and a plurality of fluid-tight articulated joints, each joint having an inlet port and a discharge port and the lengths of tubing and the joints are connected ad seriatim with joints interposed between adjacent lengths of tubing whereby the tubing can be arranged in accordance with the distribution pattern over a portion of the indefinite area. This invention finally accomplishes its desired objects by providing a method of storing or packaging a plurality of fluid conduits each of a given length connected in series by means of a plurality of fluid-tight joints where the conduits and joints are disposed in alternating sequence comprising the steps of arranging the conduits in parallel formation so that sequential joints are spaced from one another a distance generally equal to the given length.

It is an object of the invention to provide a novel fluid-tight joint for connecting fluid conduits in series.

It is another object of the invention to provide a method of distributing fluid over a generally planar surface in accordance with a predetermined distribution pattern.

Still further objects of the invention reside in the provision of a system for distributing fluids over a generally planar surface of indefinite area in accordance with a predetermined fluid distribution pattern; and a method of storing or packaging a plurality of fluid conduits each of a given length connected in series by means of a plurality of fluid-tight joints where the conduits and joints are disposed in alternating sequence.

These together with the various ancillary objects and features will become apparent as the following description proceeds, are attained by this invention, preferred embodiments being shown in the accompanying drawings, by way of example only, wherein:

BRIEF DESCRIPTION OF THE DRAWINGS

FIG. 1 is a perspective view of a fluid distribution system with the fluid being discharged towards the inside of the circle;

FIG. 2 is a perspective view of a circular fluid distribution system with the fluid being discharged towards the outside of the circle;

FIG. 3 is a perspective view of the joint and perforate tubing or conduit;

FIG. 4 is a vertical sectional view taken in direction of the arrows and along the plane of line 4—4 in FIG. 3;

FIG. 5 is a vertical sectional view taken in direction of the arrows and along the plane of line 5—5 in FIG. 3;

FIG. 6 is a vertical sectional view taken in direction of the arrows and along the plane of line 6—6 in FIG. 3;

DETAILED DESCRIPTION OF THE INVENTION

Figure 18:
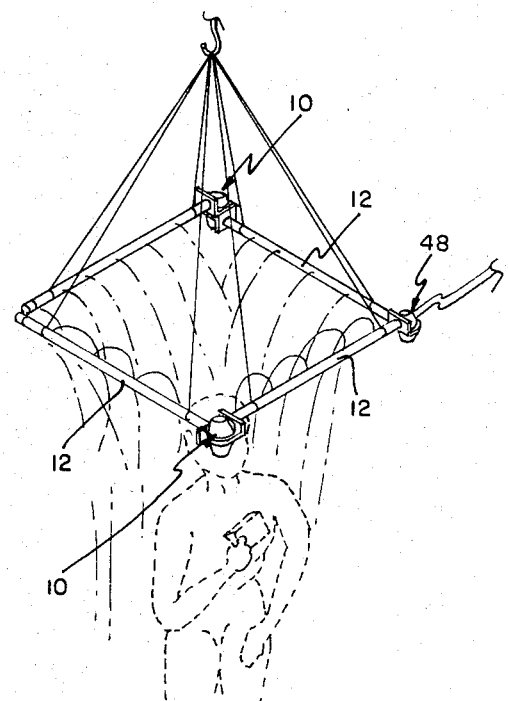
FIG. 18 is a square elevated fluid distribution system for showering purposes.
Figure 19:
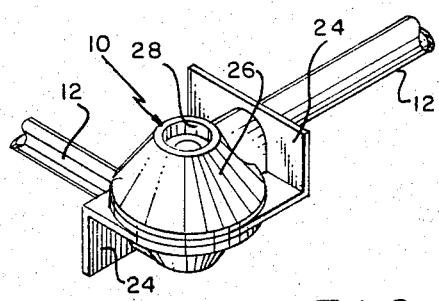
FIG. 19 is the joint positioned at right angle.

Referring in detail now to the drawings, wherein similar parts of the invention are identified by like reference numerals, there is seen a fluid-tight joint, generally illustrated as 10, for connecting perforate fluid conduits or tubes, 12, in series. As illustrated in FIGS. 5 and 6 the conduits 12 are preferably perforated 30° or 45° or 60° with respect to a horizontal plane on one side of the conduit and generally in the same direction in order that the fluid can be discharged accordingly, as illustrated in FIGS. 1, 2 and 18.

Fluid-tight joint 10 comprises an inlet port 14 and a discharge port 16. Port 14 communicates with a lower body element, generally illustrated as 18, and port 16 communicates with an upper body element, generally illustrated as 20. Ports 14 and 16 are in communication with each other through the body elements 18 and 20. Each body element 18 and 20 has a central bore 22 and a peripheral L-shaped flange 24. Flange 24 of body element 18 mates with the flange 24 of the upper body element 20 such that the bores 22—22 fall into register with one another and the body elements 18, 20 of the respective ports 14 and 16 communicate so that fluid introduced into the inlet port 14 exists through the discharge port 16.

Figure 9:
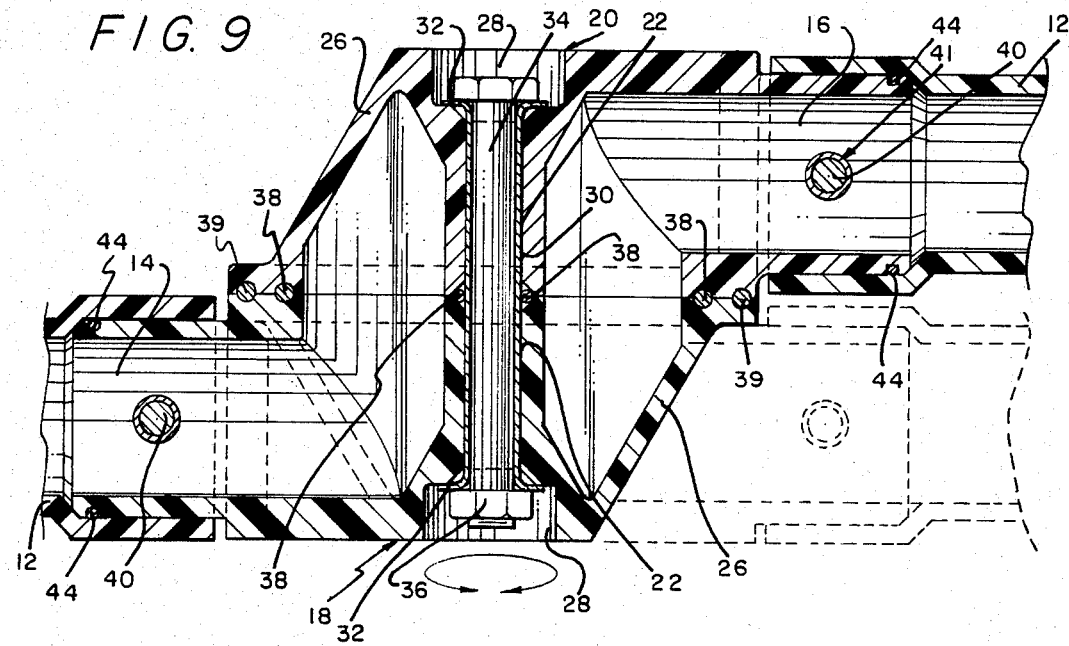
FIG. 9 is a vertical sectional view taken in direction of the arrows and along the plane of line 9—9 in FIG. 8.
Figure 10:
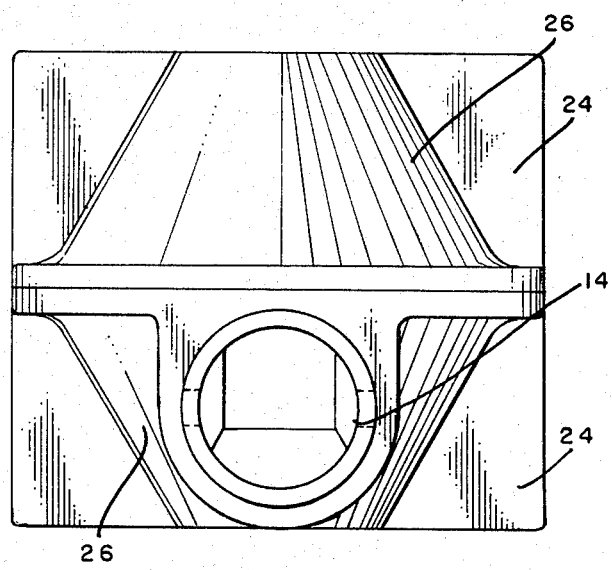
FIG. 10 is an end elevational view of the joint.
Figure 11:
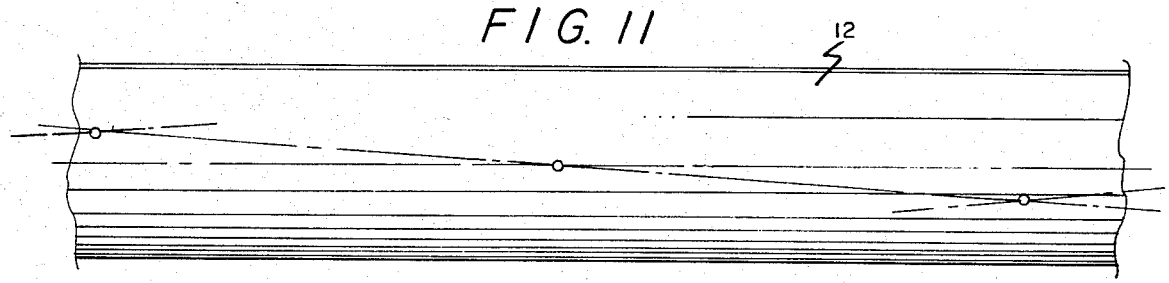
FIG. 11 is a top plan view of a section of the perforate tubing.

Part of the exterior surface of each body element 18 and 20 defines a cone 26 having a recess 28. Central bores 22—22 extend through said partial cones 26—26 from the recesses 28—28. A sleeve 30 (see FIG. 9) extends through the central bores 22—22 and is flared at its ends 32—32 to flush against the bottom of each recess 28.

A fastener, such as bolt 34 and threadably connected thereto nut 36, is received through the sleeve 30 for securing the body elements 18, 20 together while providing an axis for relative motion between ports 14 and 16. Bolt 34 and nut 36 are flushed against the flared ends 32—32 of sleeve 30. O-ring seal 38 (see FIG. 9) is sandwiched between the flanges 24—24 and at the sleeve 30 flanges 24—24 intersect for maintaining a fluid-tight connection while permitting the relative motion of the ports 14, 16 about the axis. Shear ring 39 preferably metal or higher tensile strength plastic carries tugging load to prevent bending of bolt 34.

Figure 7:
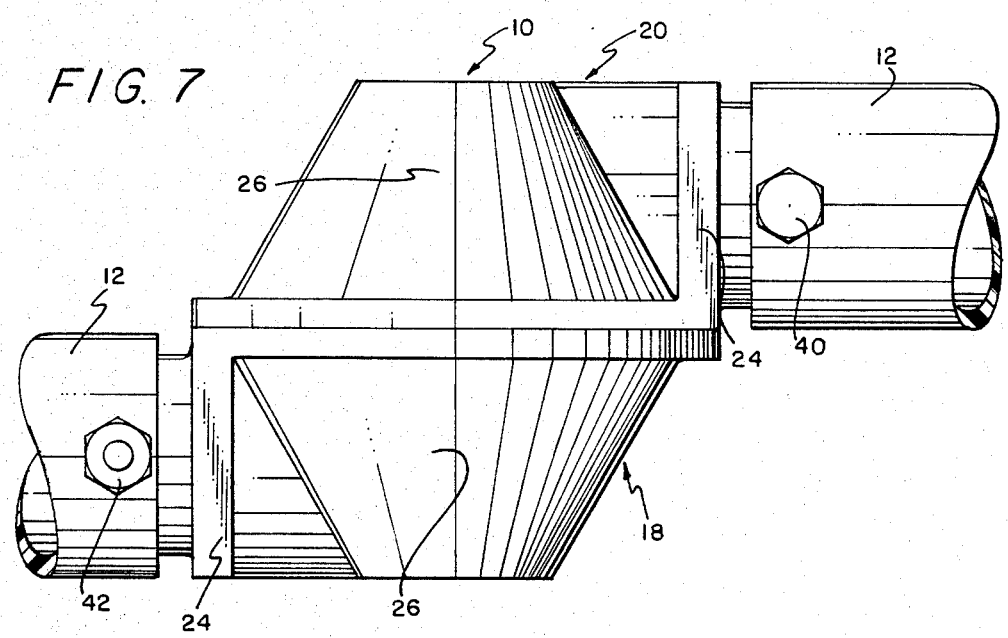
FIG. 7 is an enlarged side elevational view of the joint.
Figure 8:
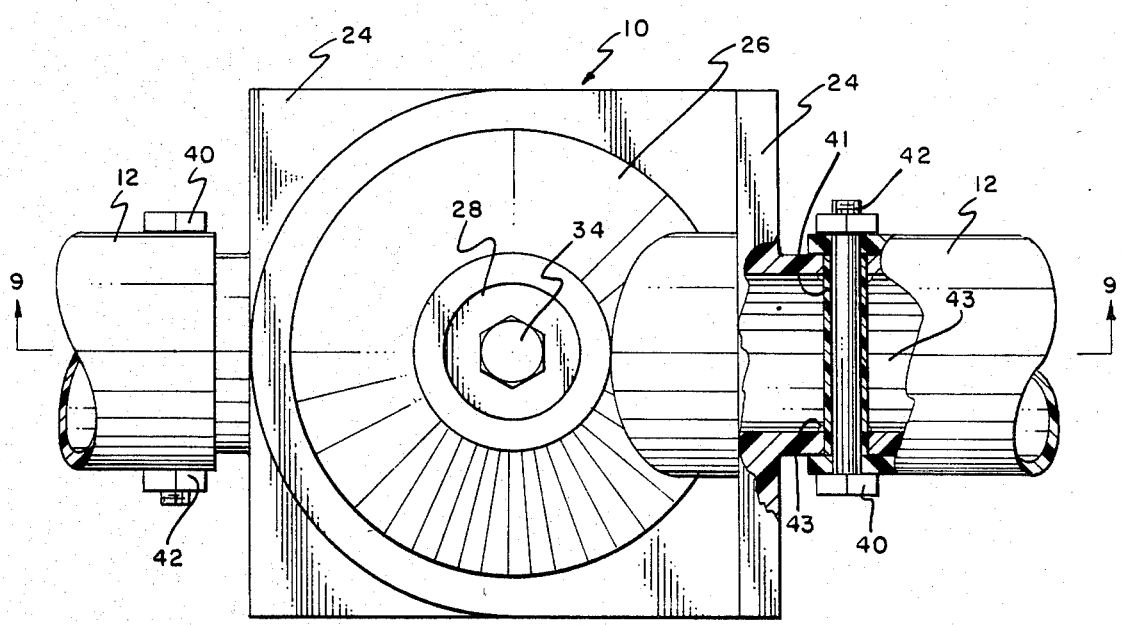
FIG. 8 is a top plan view of the joint of FIG. 7.

Inlet port 14 and discharge port 16 each include a fluid conduit 12 (see FIG. 9) overlapping thereto. Fluid conduit 12 connects to port 14 or port 16 by extending a bolt 40 (see FIGS. 3, 7, 8 and 9) therethrough and securing a nut 42 to bolt 40, which if desired can be a usual quick disconnect clevis pin, providing for rapid tube removal for add on or shortening purposes to change the length of the sprinkler system. Sealing spacer 41 around bolt 40 seals against exterior leakage. Spacer 41 can be, if desired, a press fit, or as shown in FIG. 8 it can be cemented in place to prevent leakage, cementing indicated by reference numerals 43. O-ring sealing means 44—44 (see FIG. 9) is sandwiched between each of the fluid conduits 12—12 connecting over inlet port 14 and discharge port 16.

Figure 12:
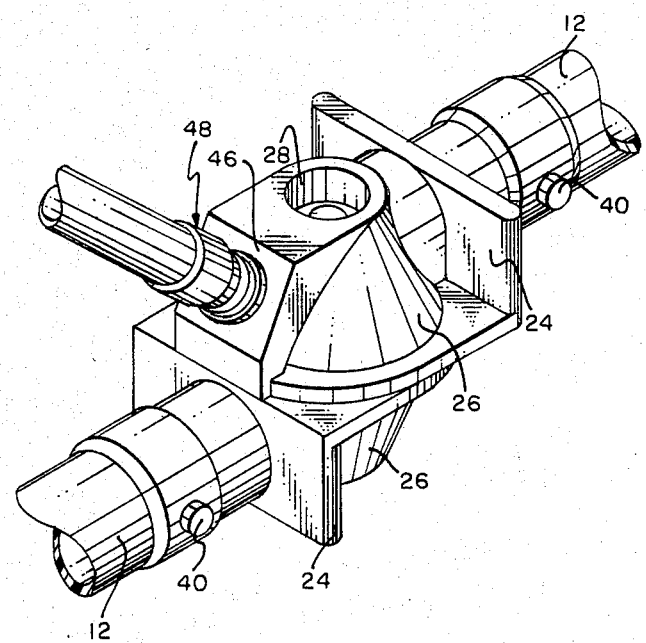
FIG. 12 is a perspective view of the joint having a hose attaching thereto.
Figure 13:
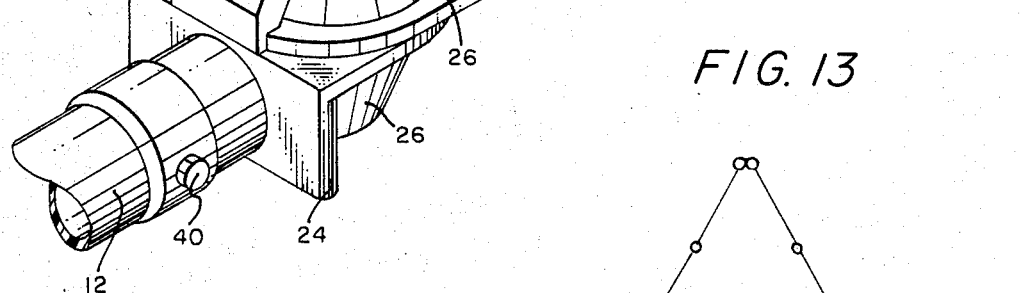
FIG. 13 is a triangular fluid distribution system.
Figure 14:
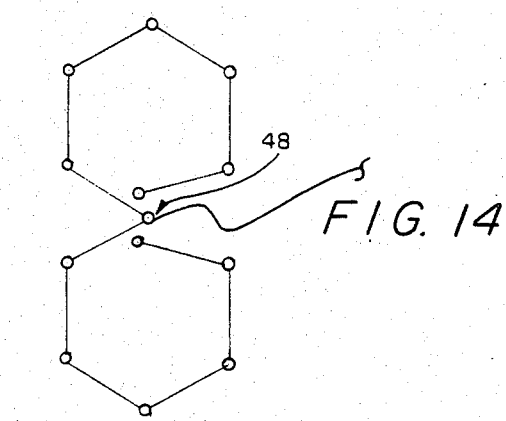
FIG. 14 is a figure eight distribution system.
Figure 15:
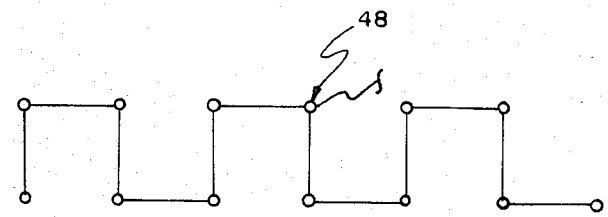
FIG. 15 is another predetermined fluid distribution system.
Figure 16:
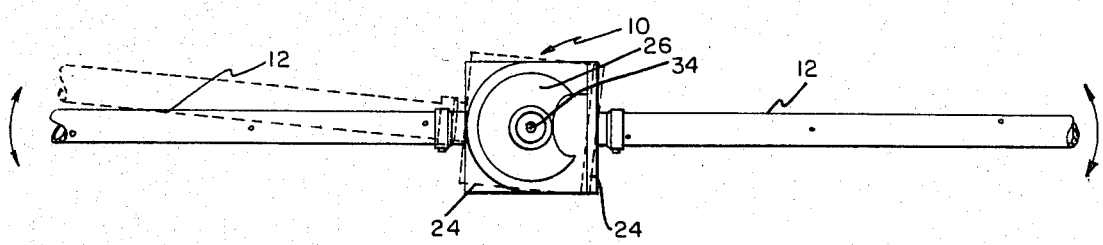
FIG. 16 is a top plan view of the joint with connecting perforate tubing.

At least one of the body elements 18 or 20 (e.g. element 20 in FIG. 12) additionally includes an aperture 46 wherethrough water is discharged into the joint 10 by a hose means, generally illustrated as 48.

With continuing reference to the drawings for operation of the invention and the system and method for distributing fluids, a plurality of perforated conduits 12 and fluid-tight joints 10 are connected ad seriatim with joints 10 interposed between adjacent lengths of conduits 12—12 and whereby the conduit 12 can be arranged in accordance with a predetermined distribution pattern (such as in FIGS. 1, 2, 13, 14, 15 and 18) over a generally planar surface of indefinite area. In a preferred embodiment of the invention, the conduits 12 are perforated in accordance to FIGS. 4, 5 and 6 such that fluid is discharged on one side of each conduit 12 and in the same direction as evidenced in FIGS. 1, 2 and 18. The joint 10 of FIG. 12, which also includes hose means 48 attaching to aperture 46, is positioned in the center or mid-point of the system as illustrated in FIGS. 1, 2, 13, 14, 15 and 18 in order to balance the fluid pressure throughout the system when hose means 48 introduces the pressurized fluid into the system.

Figure 17:
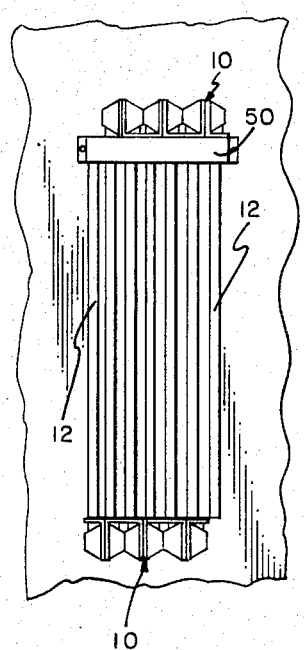
FIG. 17 is stored tubing and joints folded like a carpenter's rule.

Another embodiment of my invention is a method of storing or packaging the plurality of conduits 12, each of a given length, connected in series by means of fluid-tight joints 10 where the conduits 12 and joints 10 are disposed in alternating sequence. The conduits 12 are arranged in parallel formation like a carpenter's rule such that the sequential joints 10 are spaced from one another a distance generally equal to the given length of the conduit 12 (see FIG. 17). The arranged conduits 12—12 joints 10 are racked as illustrated in FIG. 17 such that the joints 10 rests on a rack 50.

Another embodiment of my invention is that the body elements 18 and 20 of the joints 10 could be perforated to discharge fluid therethrough while utilizing conduit 12 which doesn't have any holes. This doesn't have the flexibility of my preferred embodiment because of the need to have various lengths of conduits 12 to cover a desired area.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A fluid-tight joint for connecting fluid conduits in series comprising an inlet port and a discharge port, each port communicating with a body element having a central bore and a peripheral flange, the flange of the inlet port mating with the flange of the discharge port so that the central bores fall into register with one another and the body elements of the respective ports communicate so that fluid introduced into said inlet port exits through said discharge port;
   - fastener means received in said bores for securing said body elements together while providing an axis for relative motion between said ports;
   - and seal means sandwiched between said flanges and said bores for maintaining a fluid-tight connection while permitting said relative motion of said ports about said axis;
   - said flanges are generally L-shaped, and part of the exterior surface of each body element partially generally defines a cone including a recess, said central bores extend through said partial cones from the recesses;
   - said joint additionally comprising a sleeve means extending through said central bores, said sleeve means being flared at each end and flushed against the bottom of each recess;

said seal means is sandwiched against said sleeve means, and said fastener means extends through said sleeve means and includes ends which are flushed against the flared ends of the sleeve means.

2. The joint of claim 1 wherein said inlet port and said discharge port each include a fluid conduit overlapping and connecting thereto by means of a bolt means extending through said fluid conduit, said inlet or discharge port, and out through said fluid conduit, in order stated;

a seal means sandwiched between each of the fluid conduits connecting over the inlet port and the discharge port.

3. The joint of claim 2 wherein at least one of the body elements additionally comprising a water introducing aperture wherethrough water is discharged into the joint.

4. A system for distributing fluids over a generally planar surface of indefinite area in accordance with a predetermined fluid distribution pattern comprising a plurality of length of rigid perforate tubing;

a plurality of fluid-tight articulated joints, each joint having an inlet port and a discharge port, and lengths of tubing and said joints being connected ad seriatim with joints interposed between adjacent lengths of tubing whereby said tubing can be arranged in accordance with said distribution pattern over a portion of said indefinite area;

each port communicates with a body element having a central bore and a peripheral flange, the flange of the inlet port mating with the flange of the discharge port so that the central bores fall into register with one another and the body elements of the respective ports communicate so that fluid introduced into said inlet port exits through said discharge port;

fastener means received in said bores for securing said body elements together while providing an axis for relative motion between said ports;

and seal means sandwiched between said flanges and said bores for maintaining a fluid-tight connection while permitting said relative motion of said ports about said axis;

each of said perforate tubing is perforated such that the fluid is discharged on one side of each tubing and in the same direction;

at least one of the body elements additionally comprises a water introducing aperture wherethrough water is discharged into the joint;

said water introducing aperture is situated in the joint that is in proximity to the middle of the system;

said flanges are generally L-shaped and part of the exterior surface of each body partially generally defines a cone including a recess, said central bores extend through said partial cones from the recesses;

said system additionally comprising a sleeve means extending through said central bores, said sleeve means being flared at each end and flushed against the bottom of each recess;

said seal means is sandwiched against said sleeve means, and said fastener means extends through said sleeve means and includes ends which are flushed against the flared ends of the sleeve means.

5. The system of claim 4, wherein each of said inlet port and said discharge port of the majority of each joints include a perforate tubing overlapping and connecting thereto by means of a bolt or pin means extending through said fluid tubing, said inlet or discharge port, and out through said tubing, in order stated;

a seal means sandwiched between each of the tubings connecting over the inlet port and the discharge port.

* * * * *

UNITED STATES PATENT AND TRADEMARK OFFICE
CERTIFICATE OF CORRECTION

PATENT NO. : 4,535,938

DATED : August 20, 1985

INVENTOR(S) : Tryon S. Lindabury, Sr.

It is certified that error appears in the above-identified patent and that said Letters Patent is hereby corrected as shown below:

Column 4, line 26, delete "12", second occurrance.

Signed and Sealed this

Third Day of December 1985

[SEAL]

Attest:

Attesting Officer

DONALD J. QUIGG

Commissioner of Patents and Trademarks